United States Patent [19]
Herrington et al.

[11] Patent Number: 5,143,535
[45] Date of Patent: Sep. 1, 1992

[54] METHOD OF AND APPARATUS FOR BENDING GLASS SHEETS

[75] Inventors: Richard A. Herrington, Walbridge, Ohio; Jeffrey R. Flaugher, Carlton, Mich.

[73] Assignee: Libbey-Owens-Ford Co., Toledo, Ohio

[21] Appl. No.: 732,780

[22] Filed: Jul. 19, 1991

[51] Int. Cl.⁵ ............................................ C03B 23/023
[52] U.S. Cl. .................................. 65/106; 65/273; 65/287
[58] Field of Search ..................... 65/106, 171–173, 65/273, 287

[56] References Cited

U.S. PATENT DOCUMENTS

| | | | |
|---|---|---|---|
| 3,488,178 | 1/1970 | Welker et al. | 65/106 |
| 3,573,022 | 3/1971 | Frank | 65/106 |
| 4,221,580 | 9/1980 | Frank | 65/273 |
| 4,767,437 | 8/1988 | Lampman et al. | 65/106 |
| 4,883,526 | 11/1989 | Enk et al. | 65/106 |

Primary Examiner—Joye L. Woodard
Attorney, Agent, or Firm—Marshall & Melhorn

[57] ABSTRACT

An improved support structure for an upper press member that broadens the bending capabilities of a conventional press bending apparatus. The support structure is carried on the upper platen frame of the bending apparatus and is adapted for providing reciprocating movement between the upper press member and the upper platen frame. The support structure comprises a base plate which is attached to the platen frame and a subplate which is adapted for supporting the upper press member. Fluid activated cylinders are mounted on the base plate, with the free end of their piston rods affixed in a supporting manner to the subplate whereby actuation of the cylinders will provide relative movement between the subplate and base plate and therefor the upper press member and the platen frame.

23 Claims, 3 Drawing Sheets

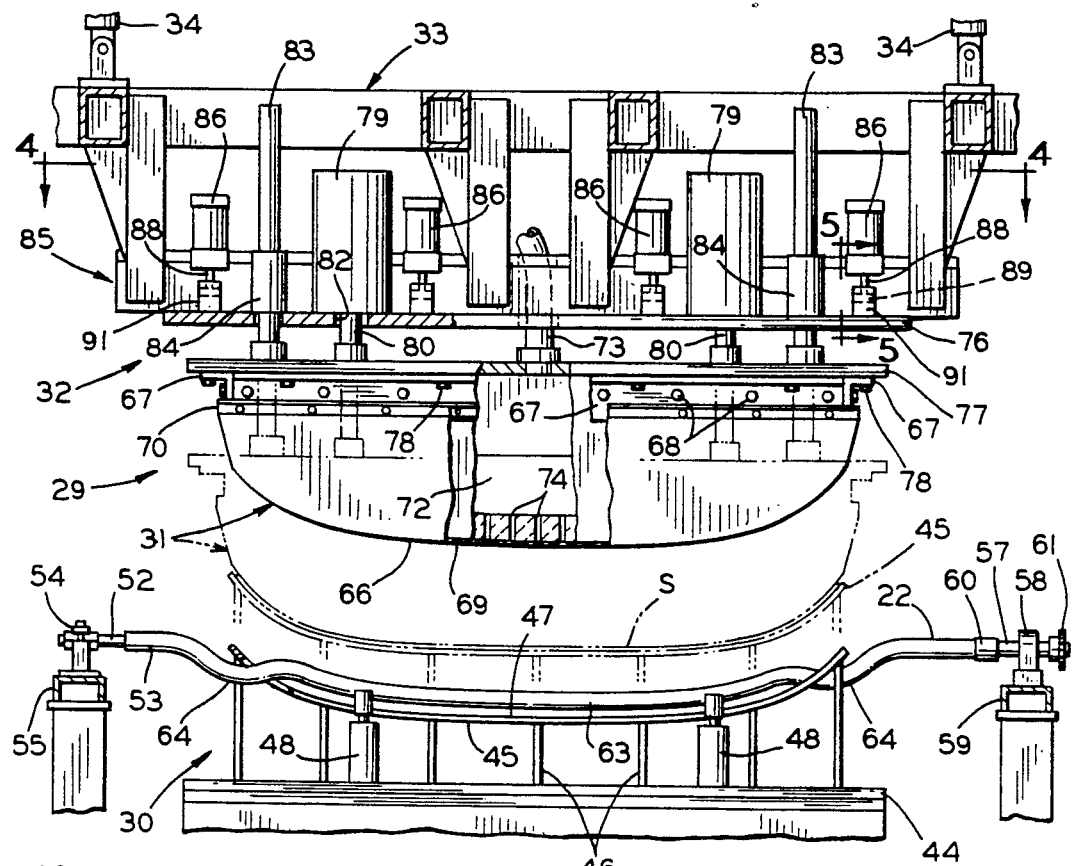
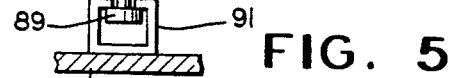
FIG. 5
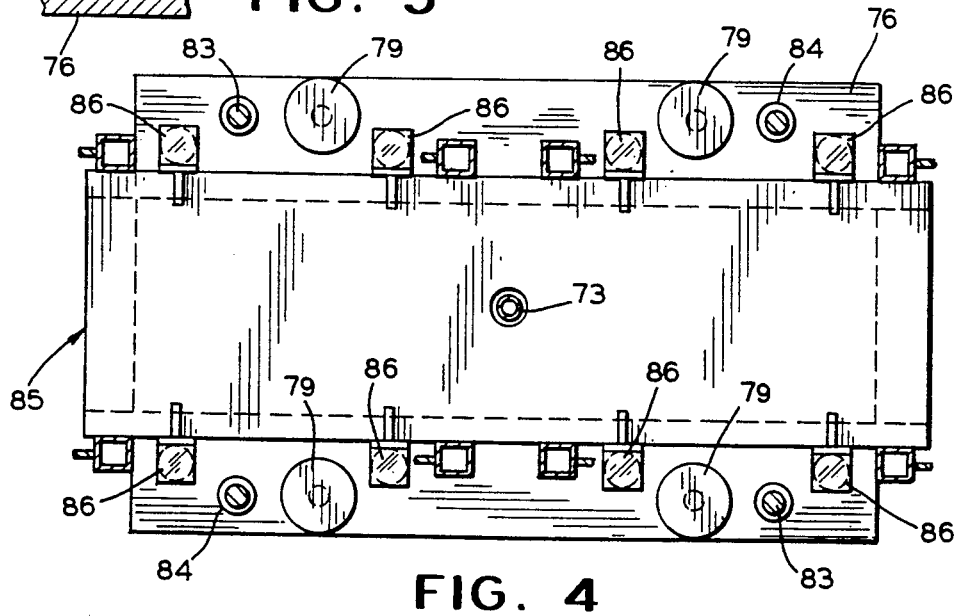
FIG. 4

METHOD OF AND APPARATUS FOR BENDING GLASS SHEETS

BACKGROUND OF THE INVENTION

1. Field of the Invention

The present invention relates generally to the production of curved glass sheets, and more particularly to an improved method of and apparatus for bending glass sheets to a relatively deep curvature.

2. Description of the Prior Art

Curved or bent glass sheets are commonly employed as glazing closures for automobiles and the like. The configuration of the glazing closure, that is, the size, shape and curvature, is dictated by the opening in which the unit is to be installed and the overall design of the automotive vehicle. As will be readily apparent, with the many different designs and body styles of automotive vehicles in production at any one time, it is necessary to produce many different styles of glazing closures. The curvature, or bend, of the glazing closures can vary from a simple, shallow curvature to a relatively deep, compound curvature.

It has recently been proposed to use glass to form the satellite dishes employed in the telecommunication industry for receiving and focussing broadcast microwave radiation. The dish can be produced from a sheet of clear or colored glass that is provided with an appropriate metal oxide coating which reflects microwave radiation. The glass sheet may be bent to the necessary dish form on a conventional press bending apparatus utilized to produce the automotive glazing closures and may be either tempered or annealed, as desired.

In a preferred method of producing the automotive glazing closures and satellite dishes in the large quantities required for efficient production, flat sheets of glass are typically heated to their softening temperature in a suitable heat treating furnace. The softened sheets are thereafter pressed to the desired curvature between complemental shaping surfaces. The curved or bent sheets are then either rapidly chilled so as to develop a desired degree of temper or are gradually cooled in a controlled manner within the annealing range of glass. These operations are generally carried out in successive steps while the sheets of glass are being substantially continuously advanced by conveyor along a horizontal path including, in succession, a heating area, a bending area, and a tempering or annealing area wherein the residual heat in the sheet following bending can be utilized for the final heat treating or tempering operation.

The aforementioned complemental shaping surfaces are formed on opposed press members, each mounted on a supporting platen. The press members and their respective platens are normally located one above and one below the horizontal path of movement of the advancing glass sheets to receive the sheets therebetween, and are relatively movable toward and away from each other for pressing the sheets to the desired shape. A hydraulic cylinder is generally employed for raising the lower platen and press member upwardly to engage and lift a heated glass sheet from the conveyor system, out of the horizontal path, and press it against the shaping surface of the opposed or upper press member. The lower platen is then lowered to deposit the bent sheet upon the conveyor system for advancement into and through an adjacent tempering or annealing section. The conveyer system is typically comprised of a plurality of longitudinally spaced rolls which provide suitable support for the heat softened glass sheet as it is conveyed through the bending area. Alternatively, the upper press member may be of the vacuum-type to support the sheet after bending as the lower press member is retracted and a carrier ring is moved into position to receive the sheet and advance it into the appropriate cooling section.

As heretofore mentioned, the upper and lower press members are mounted on their respective platens and are relatively movable toward and away from each other to bend the sheets to the desired shape. A hydraulic cylinder is generally employed for raising and lowering the lower platen during the pressing cycle, while a screw jack system or the like, is utilized for adjusting the elevation of the upper platen and associated press member relative to the lower press member. The upper press member generally is set at a predetermined elevation for the particular part being run and the lower press member is activated to lift the sheet from the conveyor and press it against the stationary upper press member. The elevation at which the upper press member is set is determined by several factors including the stroke of the hydraulic cylinder of the lower platen and the curvature and thickness of the glass sheet being run. To properly position the upper press member, the lower press member first is raised to an elevation above the supporting surface of the conveyor. The jack system associated with the upper platen is then manipulated to position the shaping surface of the upper press member at a distance from the lower shaping surface representative of the thickness of glass sheet to be bent.

While the above-described apparatus has been successful for bending glass sheets to satisfy most present day requirements, the trend to aerodynamic styling in the automotive industry has resulted in glazing closures with more pronounced curvatures and complex shapes. The relatively deep curvatures of some of these closures are becoming increasingly more difficult and, in some instances, impossible to form on conventional bending apparatus.

On conventional apparatus, the glass sheets are generally formed to a concave curvature as viewed in elevation, and the degree of curvature has a determining effect as to the elevation or vertical position at which the sheets are pressed. The deeper the curvature of the sheet, the farther the lower press member is required to travel to lift the sheet from the conveyor to a position thereabove for pressing against the upper press member. Since the upper press member is fixed at this elevation, it must not be in a position to interfere with the glass sheets entering and leaving the press area. Due to the stroke limitation of the lower hydraulic cylinder and structural obstructions on the lower press member, it is oftentimes impossible when bending deeply curved sheets to establish the fixed position of the upper press member at an elevation that does not interfere with the travel of the glass sheet. The problem is further complicated when employing a shuttle carrier system for removing the curved sheet after bending. In this instance, a vacuum male mold is used to support the sheet after bending, and sufficient space must be provided between the conveyor and the supported sheet to permit entry of the carrier ring.

Of course, it is conceivable to utilize the existing upper screw jack system for maneuvering the platen frame in a reciprocating manner to alternately move the upper press member from a position that permits unobstructed conveyance of the glass sheet to the preselected position for pressing the glass sheet. While the system is capable of functioning properly in this manner on a production basis, the maneuvering of the entire platen frame assembly with the press member during each bending cycle would substantially reduce the speed of the operation, adversely affecting productivity.

While these problems are evident when bending automotive glazing closures having relatively deep curvatures as discussed above, they also are encountered when bending other deeply curved glass products such as architectural glazing and the heretofore mentioned glass satellite dish.

SUMMARY OF THE INVENTION

The present invention overcomes the above-noted shortcomings of the prior art by providing an improved method and apparatus for press bending glass sheets to a relatively deep curvature in a continuous and efficient manner. The apparatus of the invention comprises a novel support structure for supporting the upper press member on the platen frame of a conventional press bending apparatus that permits vertical reciprocation of the press member relative to the platen frame. The novel support structure includes a base plate for attachment to the platen frame in a conventional manner and a subplate that is mounted on the base plate in a manner to permit reciprocation of the subplate relative to the base plate. The subplate is adapted for carrying any of a variety of press members in typical fashion.

Thus, when the curvature or complex shape of a particular part dictates the pressing of the sheet at an elevation wherein the fixed position of the upper press member would interfere with the conveyance of the glass sheet, the present invention provides apparatus to quickly and easily move the upper press member into and out of the pressing elevation in a timely and efficient manner. The novel apparatus of the invention also may be utilized to increase efficiency on more conventional parts by decreasing the press cycle time by maintaining the upward travel of the lower press member at a minimum. To that end, the elevation at which the sheet is to be press bent is set at a short distance above the conveying surface. The upper press member can either be lowered to this position and the lower press member raised to press the sheet thereagainst, or the lower press member and the sheet elevated to this position and the upper press member lowered into pressing engagement therewith. For that matter, the two press members may be operated simultaneously to converge and bend the sheet at this elevation. In any instance the upper press member is reciprocated into and out of the press bending elevation by means of the novel apparatus of the invention.

BRIEF DESCRIPTION OF THE DRAWINGS

In the drawings, wherein like numerals refer to like parts throughout:

FIG. 3 is an enlarged sectional view taken substantially along line 3—3 of FIG. 2;

FIG. 4 is a plan view taken substantially along line 4—4 of FIG. 3;

FIG. 5 is an enlarged sectional view taken along 5—5 of FIG. 3;

DETAILED DESCRIPTION OF THE PREFERRED EMBODIMENT

Figure 1:
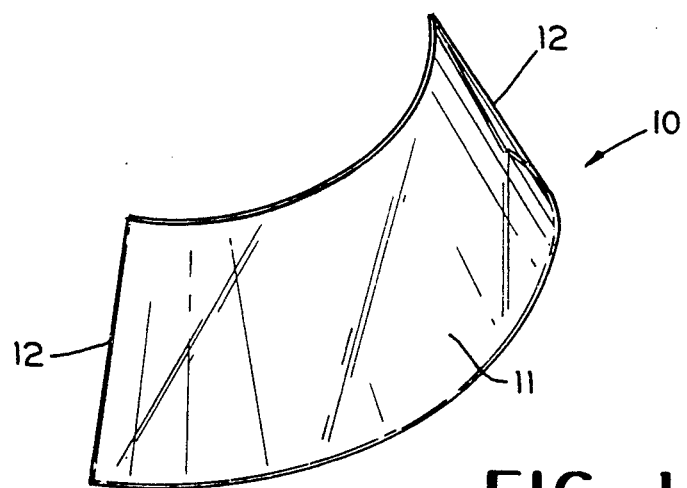
FIG. 1 is a perspective view of an automobile glazing closure having a relatively deep bend and produced in accordance with the present invention.

Referring now in detail to the drawings, there is illustrated in FIG. 1 a glazing closure 10 bent to the desired configuration in accordance with the method and apparatus of the invention and which is intended for use as a backlight in an automotive vehicle. The glazing closure, or backlight 10 is comprised of a single glass sheet having a deeply curved central portion 11 and opposite end potions 12. While the method and apparatus of the invention will be described in connection with the production of a single glass sheet for a backlight, it should be understood that the principles of the invention are equally applicable in the production of other automobile glazing closures such as conventional laminated windshields, for example, having multiple layered sheets of glass.

Figure 2:
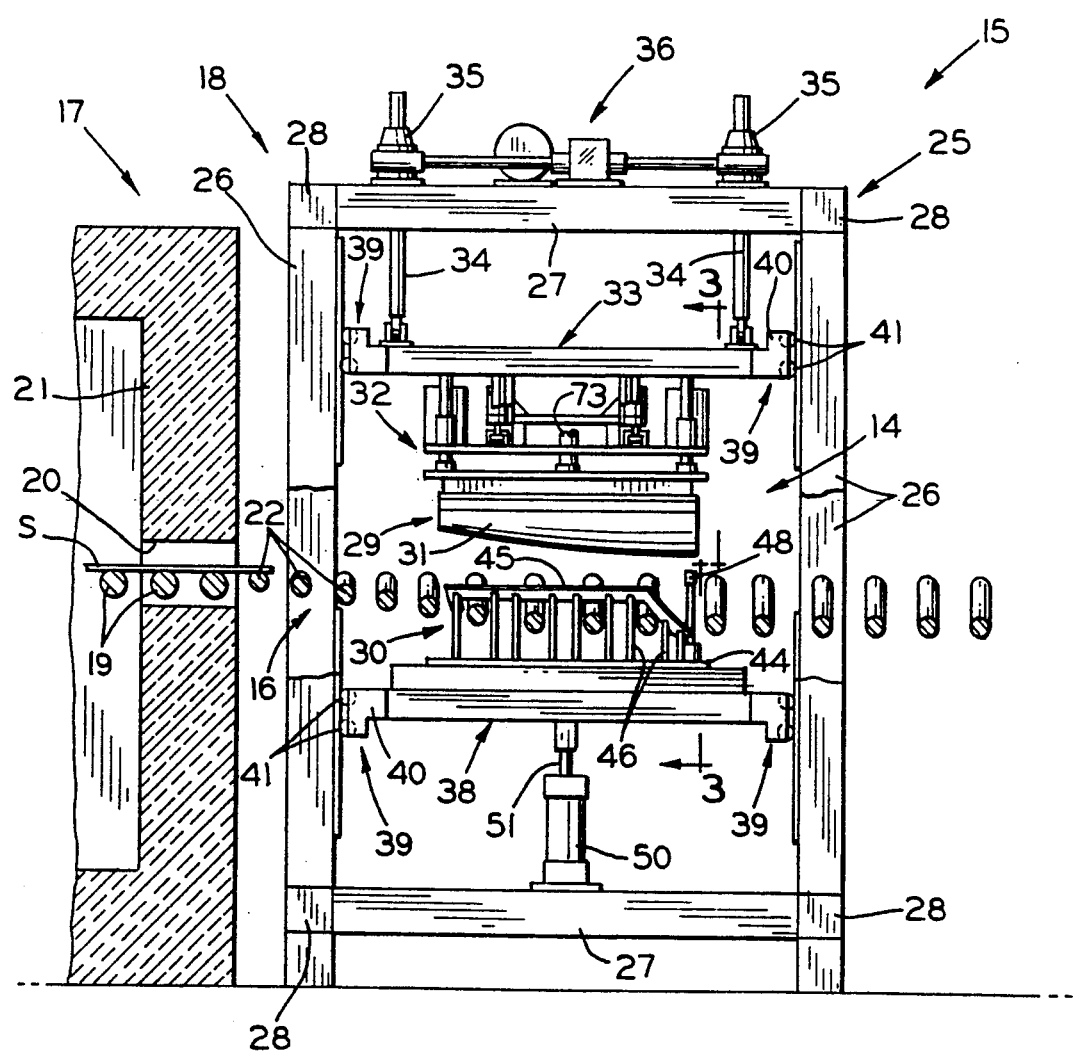
FIG. 2 is a side elevational view of a press bending apparatus incorporating the novel features of the present invention.

With reference now to FIG. 2, there is illustrated the novel glass sheet bending apparatus of the invention comprehensively designated 14, embodied in a conventional horizontal press bending apparatus, identified generally at 15. The apparatus 15 more particularly includes a continuous conveyor system 16 for supporting and conveying glass sheets S along a generally horizontal path through a heating furnace 17 for heating the sheets to their softening point or bending temperature, a press bending station 18 embodying the novel bending apparatus 14 whereat the sheets are bent to the desired shape, and thereafter to subsequent stations (not shown) where the heated bent sheets are appropriately cooled so as to be tempered or annealed for subsequent fabricating steps.

The glass sheets S are conventionally heated in a controlled manner while being carried sequentially through the furnace 17 on aligned conveyor rolls 19 forming part of the conveyor system 16. The sheets, heated to their proper bending temperature, exit the furnace through an opening 20 in the rear end wall 21 and are transferred onto a second series of conveyor rolls 22, also forming a part of the conveyor system 16. The rolls 22 support and convey the glass sheets S horizontally into and within the bending station 18 before and after bending, and then advance the bent sheets to the next processing step (not shown) typically tempering or annealing of the sheets.

The press bending station 18 more particularly, comprises a skeletal framework 25, generally in rectangular parallelpiped form, including upstanding corner posts 26 interconnected at their top and bottom by longitudinal beams 27 and transverse beams 28 to form a rigid box-like structure. The rolls 22 of the bending station are drivingly mounted upon the framework in a conventional manner not shown). Mounted within the framework 25 for reciprocating relative movement toward and away from each other are the upper and lower press members 29 and 30 which are provided with opposed complemental shaping surfaces conforming to the curvature to which the sheets are to be bent.

The upper or male press member 29 comprises a substantially solid shaping element 31 and is mounted upon the novel support structure of the invention, generally designated 32. The support structure 32, as will be hereinafter more fully described, is in turn carried upon a platen frame 33. The platen frame is preferably constructed to be vertically adjustable in order to accommodate glass parts bent to varying degrees of curvature between the opposed press members. Accordingly, the platen frame 33 is operatively attached at each of its corners within the framework 25 to the lower ends of screw jack rods 34 of associated screw jacks 35 carried on a framework comprised by the beams 27 and 28 atop the framework 25. Also carried atop the framework is a motorized drive unit 36 adapted to drive the screw jacks 35 in unison for retracting or extending the rods 34 to correspondingly raise or lower the platen frame 33 and the shaping element 31 carried thereby.

The lower or female press member 30 is mounted for vertical reciprocal movement and is carried upon a platen frame 38 similar in construction to the platen frame 33. In order to insure that the platen frames move freely up and down along a precise vertical path within the framework 25, they are provided at each of their corners with stabilizing roller guide means 39. The guide means 39 include brackets 40 affixed to the corners of the platen frames 33 and 38. Each bracket carries a plurality of rollers 41 suitably mounted to rollingly engage track plates 42 affixed to adjacent angularly disposed faces of the associated corner posts 26. The platen frames are thus held firmly against lateral movement while being able to move freely up and down along a vertical path.

The lower press member 30 is of conventional outline or ring-type construction, and normally resides in a rest position below the rolls 22 of the bending station 18. The press member 30 is mounted for vertical reciprocal movement to lift a sheet S from the rolls 22 and press it against the upper press member 29, and then return the bent sheet to the rolls 22 for advancement out of the bending station 18 for further processing.

More particularly, as shown in FIGS. 2 and 3, the lower press member 30 comprises a base member 44 secured to the platen frame 38 and a shaping rail 45 affixed in spaced relation to the base member by means of a series of mounting posts 46. The shaping rail conforms in outline to the glass sheets to be bent, and is provided on its upper face with an upwardly directed shaping surface 47 to impart the desired curvature to the sheet. The particular outline of the shaping rail 45, as well as the specific curvature of the shaping surface 47, of course, are dictated by the predetermined finished shape of the glass sheet being bent and can vary as desired. A spaced pair of vertically reciprocal stop means 48 is conventionally provided on the base member 44 between adjacent ones of the rolls 22 for precisely positioning incoming glass sheets S relative to the upper and lower press members 29 and 30, respectively The base member 44 is carried by the lower platen frame 38 and is movable therewith. A fluid actuated cylinder 50 is mounted beneath the platen frame 38 and carried by the beams 27. The cylinder includes a piston rod 51 affixed at its distal end to the platen frame 38 for reciprocally moving the lower or female press member 30 between its retracted position, whereat the shaping rail 45 is below the conveyor rolls 22, and its raised position whereat the shaping rail lifts a heated sheet S from the conveyor rolls and presses it against the male press member 29 between the complementary shaping surfaces of the male element 31 and the shaping rail 45, to bend it to a predetermined curvature. Upon completion of bending, the piston rod 51 is retracted to lower the platen frame 38, thereby retracting the shaping rail 45 beneath the conveyor rolls 22 and depositing the bent sheet thereon for advancement out of the bending station.

The conveyors rolls 22 employed in the bending area are preferably of the contoured type comprising an inner, hollow, stationary core member and an outer, flexible, load carrying sleeve rotatable thereabout. Such contoured conveyor rolls are disclosed and described in U.S. Pat. No. 3,905,794 which is incorporated herein by reference. The construction of the roll per se does not constitute part of the present invention, and reference may be had to the patent for details of the construction of a preferred form of core member and rotatable sleeve.

Contoured rolls of increasing curvature may be employed leading into the press bending area to preform the glass sheets prior to bending between the opposed shaping surfaces. Likewise, such contoured rolls may be advantageously employed in conveying the bent sheets from the press bending apparatus into an adjacent processing station.

As best shown in FIG. 3, the contoured conveyor rolls 22 include a core member 52 as of stainless steel tubing and an outer, flexible, load carrying sleeve 53 surrounding and freely rotatable about the inner core member. At one end of the contoured rolls the stationary core member 52 extends beyond the end of the rotatable sleeve 53 and is secured against rotation by suitable mounting means 54 upon a side rail 55 of the structural framework. At its other or driving end, the core member 52 telescopingly receives a stub shaft (not shown) which is fixed to the core member and concentrically journalled within a rotatable cellar 57. The collar 57 is journalled for rotation in a bearing 58 carried on a side rail 59 of the structural framework. The end of the outer sleeve 53 is attached to the rotatable collar 57 by a coupling member 60 fixedly secured on the collar. A pinion 61, adapted to be driven by a suitable endless drive chain (not shown), is rigidly secured on the collar 57. Driving of the pinion 61 by the drive chain thus rotates the collar 57 about the stationary stub shaft affixed to the core member 52 and, in turn, rotates the coupling member 60 so as to cause the outer sleeve 53 to rotate about the core member.

The series of rolls which are disposed in the press area are configured so as to permit unhindered operation of the lower or female press member 30. To that end, the rolls 22 include a generally concave central portion 63 which engages the lower surface of the sheet, and opposite generally U-shaped end portions 64 which pass beneath the lower shaping rail 45 while in its lowered position.

The upper male press member 29 of the invention is of the so-called solid or continuous type. To that end, the male shaping element 31 includes a continuous glass shaping surface identified generally at 66, having a configuration complementary to that of the lower female press member 30. The shaping element 31 is formed of any suitable refractory material capable of withstanding the elevated temperatures to which it is subjected. Angle brackets 67 affixed to the upper edge of the shaping element 31 as by fasteners 68, are provided for mounting the shaping element to the support structure 32 of the invention, as will be hereinafter more fully described.

To provide a resilient non-abrasive surface for contact with the heat softened glass sheet and to provide insulation, the shaping surface 66 is covered with a sheet 69 of heat-resistant cloth, such as woven or knit fiberglass or the like. The cloth sheet 69 is stretched tautly over the shaping surface 66 and held in place by any suitable means such as the mounting brackets 70 affixed as by welding, to the lower end of the angle brackets 67.

The upper mold member is commonly adapted to provide positive and negative air pressure to assist in the shaping and handling of the glass sheets. The negative air pressure, or vacuum, for example may be employed on the shaping surface of the upper mold to assist in the shaping of the glass sheet as the sheet is being pressed between the opposed shaping surfaces. After bending, the sheet is retained by vacuum against the upper shaping surface as the lower mold member is retracted and a carrier ring is brought into position to receive the sheet and convey it out of the press area. The vacuum is discontinued and a slight positive pressure is generally initiated to release the sheet from the upper shaping surface and deposit it on the carrier ring.

To that end, the shaping element 31 is formed with a chamber 72 that serves as a manifold for the positive and negative air pressure. A conduit 73 is appropriately and selectively connected to a source of air under pressure or vacuum (not shown) and in communication with the chamber 72. The shaping element is provided with suitable air passages on the shaping surface 66 that communicate with the chamber 72. The air passages may be in the form of drilled holes such as at 74, or the shaping element 31 may be formed of a suitable porous refractory material that would permit a uniform flow of air along the shaping surface without the need for drilled passageways.

In a conventional press bending apparatus, the shaping elements of the upper and lower press members are mounted on base plates that are carried by the respective upper and lower platen frames. The upper platen frame, as heretofore described, is provided with a jack system which permits vertical displacement of the platen frame and associated press member to properly position the upper shaping element relative to the lower shaping element as determined by the part to be produced. The elevation at which the upper press member is positioned is determined primarily by the curvature and thickness of the part. This displacement system for adjusting the elevation of the upper shaping element performs admirably and is suitable for most present day requirements. However, the trend toward aerodynamic styling has resulted in some automobile windows having an exaggerated curvature which is difficult if not impossible to produce efficiently on the conventional bending apparatus.

In accordance to the present invention a novel support structure 32 for carrying the upper shaping element is provided which enhances the versatility of the conventional press bending apparatus. The support structure includes means that permit rapid and controlled reciprocation of the upper press member into and out of the pressing elevation in the bending cycle.

The novel support structure 32 comprises a base plate 76 adapted for attachment to the upper platen frame 33, in a conventional manner as will be hereinafter more fully described, and a subplate 77 for carrying the shaping element 31. The shaping element is secured to the subplate by means of fasteners 78 through appropriate apertures (not shown) provided in the angle brackets 67 and subplate 77.

The subplate 77 is mounted for reciprocation on the base plate 76. To that end, a plurality of linear actuators, such as fluid cylinders 79, for example, are suitably mounted on the base plate 76 with the associated piston rods 80 extending through appropriate openings 82 provided in the base plate. The piston rods are connected at their free ends the subplate 77. Guideposts 83, connected at their lower ends to the four corners of the subplate 77, respectively, extend upwardly through suitable bushings 84 mounted on the base plate 76 for sliding movement therethrough to properly guide the subplate in its vertical reciprocating movement.

The base plate 76 is detachably secured to the platen frame 33 in a conventional manner which permits easy removal for maintenance and changeover from one part to another. The platen frame 33 includes a mounting platform 85 having a plurality of actuating cylinders 86 attached thereto that are adapted for supporting the base plate 76. To that end, as best shown in FIG. 5, the free end of each respective piston rod 88 is provided with an enlarged head 89 that is captured by the opposed upper walls 90 of an associated C-shaped mounting bracket 91 affixed to the base plate 76. Thus, as can be readily appreciated, retracting the piston rods 88 with the heads 89 captured by the associated brackets 91, will urge the base plate upwardly into intimate engagement with the platform 85 securely attaching the press member 29 to the platen frame 33. Conversely, the piston rods 88 are extended to relieve the upward force exerted by the heads 89 against the upper walls 90 of the brackets 91, to permit disengagement therefrom and easy removal of the press member.

In a typical press bending operation, the sheet is heated in a furnace to the bending temperature and thereafter carried on horizontally aligned conveyor rolls into position for bending between the upper and lower press members. The lower press member is then raised to lift the sheet off the rolls and into pressing engagement with the upper press member bending the sheet to the desired curvature. The upper press member, generally, is stationary as the sheet is lifted into engagement with its shaping surface and at an elevation that does not interfere with the sheet as it is conveyed into and out of the press area. The elevation at which the upper press member is set is primarily determined by the curvature and thickness of the part being produced. The deeper the curvature, the greater the distance the lower press member must travel to lift the sheet off the conveyor rolls. Since this travel is limited by the maximum stroke of the cylinder employed and by structural obstructions that may exist on the press member, it is not always possible when bending deeply curved parts to set the stationary position of the upper press member at an elevation high enough to insure that it will not interfere with conveyance of the glass sheet. As previously mentioned, while the conventional jack system associated with the upper press member can be employed to cycle the press member into and out of position for pressing, it is relatively slow and will have an adverse effect on the rate of production.

Reviewing briefly operation of the invention hereinabove described, glass sheets s are carried through the furnace 17 by the conveyor 16 where the temperature is gradually raised to the softening point of the glass. The heated sheets are received from the furnace upon contoured rolls whereupon they tend to sag into conformity with the rolls as they are advanced into position for press bending between the upper and lower press members 29 and 30. Prior to the sheet entering the press area, the piston rods so of fluid actuators 79 are retracted to raise the upper press member 29 into the elevated rest position as shown in solid lines in FIG. 3, to allow for the unobstructed conveyance of the sheet into the press area. Of course, at this time the lower press member 30 is in the lowered position, with the shaping rail 45 below the supporting surface of the rolls.

When the leading edge of the sheet engages the stop means 48 the sheet is properly positioned, at which time a suitable timing mechanism (not shown) is activated to extend the piston rods so to lower the upper press member 31 into the press bending position shown in phantom in FIG. 3. At the same time the cylinder 50 raises the lower press member 30 to lift the sheet from the conveyor for press bending between the shaping surfaces 47 and 66.

The elevation at which the sheet is press bent between the shaping surfaces is determined by the stroke of the lower cylinder $o and is conveniently set to substantially correspond to the maximum extension of the piston rod $1. The upper press member 29 is then set to this elevation by appropriate adjustment of the screw jacks 35 in a manner to properly position the shaping surface at the bending elevation upon full extension of the piston rods 80. It will be appreciated that the press bending sequence of operation can be varied without departing from the scope of the invention. The upper press member 29 may be lowered to the press bending elevation and stationary when the lower press member 30 is raised to press the sheet thereagainst. Conversely, the lower press member may be raised to elevate the sheet to the proper bending position and stationary as the upper press member is lowered to press bend the sheet. Likewise, the two press members may converge to simultaneously meet at the press bending elevation to press the sheet therebetween.

After the sheet S is precisely curved between the shaping surfaces 47 and 66, the lower press member 30 is retracted and the sheet is deposited on the contoured rolls for advancement into a further processing station. While the sheet has by this time generally cooled sufficiently to retain its shape, the contoured rolls provide support to assure that further sagging does not occur upon immediate removal of the support of the shaping rail 45.

It will thus be apparent that the reciprocating action provided by the novel support structure 32 of the invention when utilized in conjunction with the screw jack system of a conventional bending apparatus, is capable of press bending glass sheets having various degrees of curvature without adversely affecting the normal rate of production. Moreover, in many instances the support structure can be utilized to increase the production rate when bending glass sheets having more shallow curvatures. To that end, the elevation above the conveyor rolls at which the sheet is bent is reduced to the minimum distance allowable to adequately clear the rolls instead of the elevation as determined by the maximum stroke of the lower cylinder. Thus, the travel of the lower press member is reduced which ultimately results in a decrease in the press cycle time.

Figure 6:
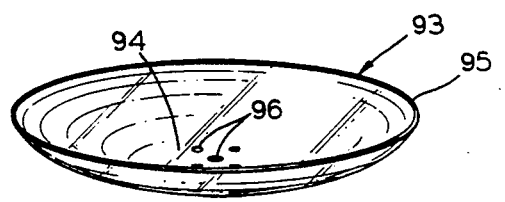
FIG. 6 is a perspective view of a satellite dish produced in accordance to the invention.

Referring now to FIG. 6 there is shown a communication satellite dish or parabolic reflector 93 produced in accordance to the present invention on a press bending apparatus utilizing a shuttle carrier ring for transporting the curved sheet out of the bending area after it is shaped to the desired curvature. The satellite dish 93 is bowel-shaped in the form of a paraboloid of revolution and includes a deeply curved or displaced central portion 94 and an upper circumferential edge portion or rim 95. The central portion 94 is provided with a plurality of suitable apertures 96 for mounting the dish and attaching associated equipment thereto.

The press members utilized to produce the satellite dish 93 are similar in construction to the press members utilized to produce the backlight 10 and comprise a socalled solid upper male press member 98 and a continuous ring-type lower female press member 99. The upper and lower press members 98 and 99 are provided with opposed complemental shaping surfaces and are mounted for reciprocating movement toward and away from each other within the framework 25 on the respective upper and lower platen frames 33 and 38.

The upper press member 98 is carried upon the novel support structure 32 of the invention and comprises a substantially solid shaping element 100 having a continuous glass shaping surface 101 in the form of a paraboloid of revolution. The shaping element 100 is formed of a suitable refractory material with the shaping surface 101 covered with a sheet 102 of heat-resistant cloth, such as woven or knitted fiberglass or the like. A chamber 103 is formed in the shaping element 100 and serves as a manifold for maintaining positive and negative air pressure supplied through the conduit 73 on the support structure 32, as previously described. Air passages 104 that communicate with the chamber 103 are provided in the shaping surface 101. Thus, a vacuum may be applied at the shaping surface 101 to assist in the shaping of the heat softened glass sheet and thereafter to support the curved sheet thereagainst as the lower press member 99 is retracted. The curved glass sheet may be returned to the conveyor rolls after the sheet has cooled sufficiently to set its curvature or a shuttle carrier ring, as will be hereinafter more fully described, may be introduced to receive the curved sheet from the upper press member and transport it into an adjacent processing station.

The lower press member 99 comprises a base plate 106 that is secured to the platen frame 38 and a continuous shaping rail 107 affixed in spaced relation to the base plate by means of a series of mounting posts 108. The shaping rail includes an upwardly directed shaping surface 109 complemental to the upper shaping surface 101 of the shaping element 100.

The heat softened glass sheet is supported in a generally horizontal plane on the conveyor rolls 22 as it exits the furnace and is positioned for bending between the opposed press members 98 and 99. To that end, at least the rolls that extend through the lower press member 99 are of the contoured type and include a horizontally extending central portion 111 and opposite generally U-shaped portions 112 which pass beneath the lower shaping rail 107 while in its lowered position.

Figure 7:
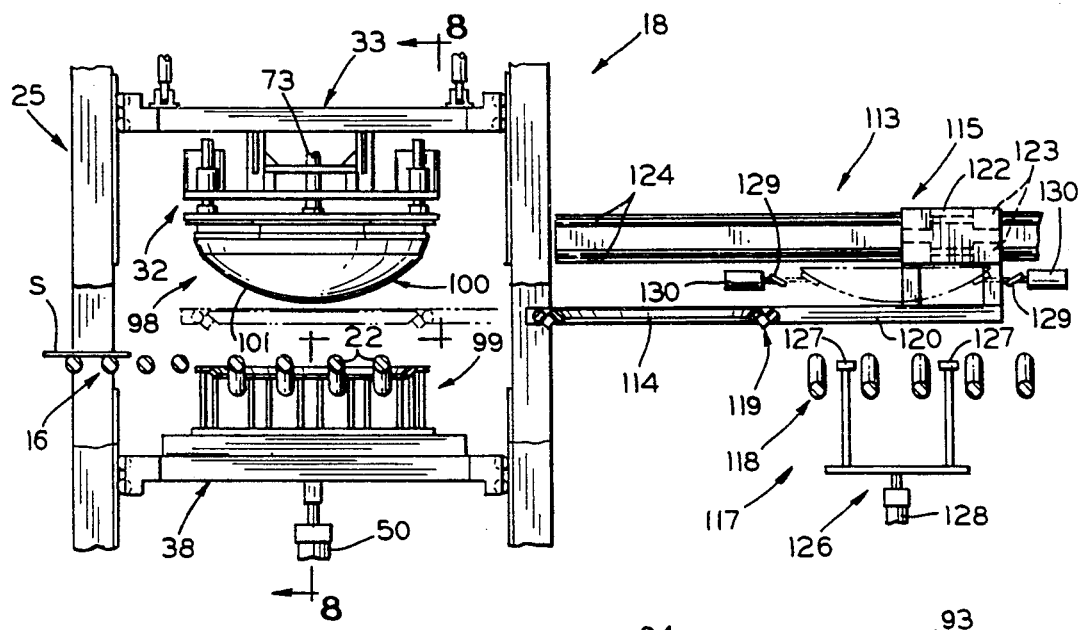
FIG. 7 is a fragmentary side elevational view of an alternate form of a press bending apparatus incorporating the novel features of the present invention.
Figure 8:
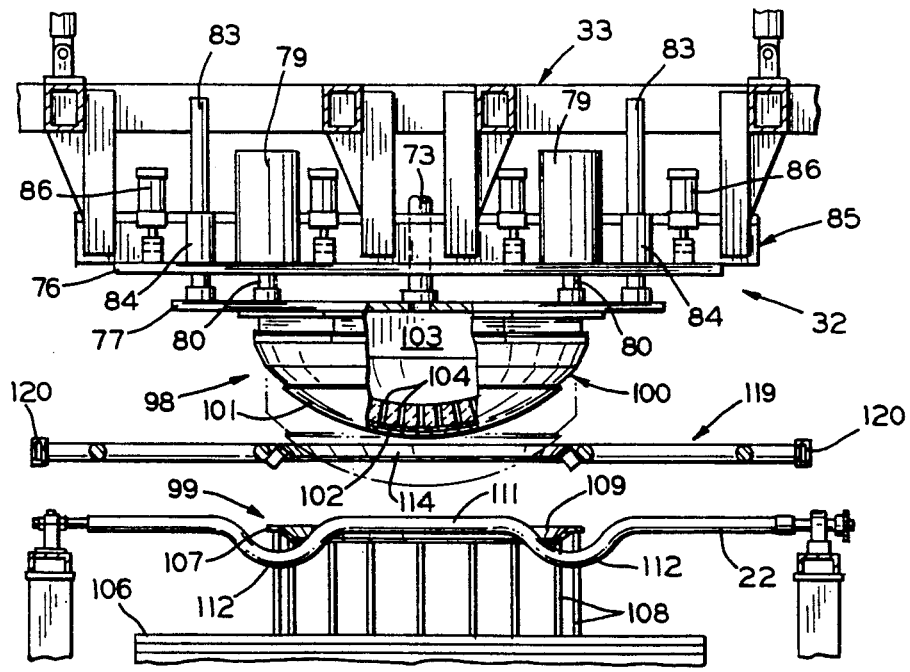
FIG. 8 is an enlarged sectional view taken substantially along line 8—8 of FIG. 5 with the carrier ring in position for receiving the bent sheet.

As best shown in FIGS. 7 and 8, a shuttle mechanism indicated generally at 113, including a carrier ring 114 and a carrier ring transport apparatus 115 is provided for transporting the curved glass sheets from the bending station 18 to an unloading station 117 whereat the curved sheet is removed from the carrier ring 114 and placed on a take-away roller conveyor section 118. Such shuttle mechanism and unloading station is disclosed and described in U.S. Pat. No. 4,883,526, which is incorporated herein by reference. The construction and operation of the same per se does not constitute part of the present invention, and reference may be had to the patent for details of the construction and operation of a preferred form of the shuttle mechanism and unloading station.

The carrier ring 114 is connected to a framework 119 which is carried by a pair of cantilevered longitudinally extending support arms 120, affixed at their one end to respective guide plates 122 (only one of which is shown). The guide plates include bearings 123 which engage horizontal rails 124 disposed on opposite sides of the path of travel, thereby allowing horizontal movement of the cantilevered support arms 120 and carrier ring 114 in the direction of movement of the glass sheets through the facility. A suitable drive unit (not shown) is interconnected with the guide plates 122 for transporting the carrier ring 114 in a controlled reciprocating manner between the bending and unloading stations 18 and 117.

The unloading station 117 includes an elevator 126 located below the conveyor rolls of the take-away roll section 118, and comprises cross supports 127, which are generally shaped to conform to the curvature of the bent glass sheet. A suitable lift mechanism such as a fluid actuator 128, is provided to elevate the cross supports 127 to lift the bent sheet form the carrier ring 114 when the carrier ring is properly positioned at the unloading station. While the bent sheet is in the elevated position, opposed support members 129 affixed to the free end of the piston rod of respective actuating cylinders 130, are extended to occupy positions below the undersurface of the glass sheet. As the cross members 127 are lowered the bent sheet is deposited on the extended support members 129 as shown in phantom liens in FIG. 7, and the carrier ring 114 is shifted to a rest position outside of the unloading station. Once the carrier ring is clear of the supported sheet, the cross members 127 are elevated to lift the glass sheet from the support members 129 at which time the support members are retracted and the cross members 127 lowered to deposit the sheet on the take-away roll section 118 whereupon it is advanced to the next processing station.

Reviewing briefly operation of the invention, the heated glass sheets S are advanced upon the conveyor rolls 22 into position for press bending between the upper and lower press members 98 and 99. When properly positioned, the sheet is lifted from the conveyor rolls 22 by the shaping rail 107 to a stationary pressing location above the rolls 22 at which time the fluid actuators 79 are activated to lower the shaping element 100 from its rest position into engagement with the glass sheet for press bending between the shaping surfaces 101 and 109. A vacuum is initiated on the shaping surface 101 to support the curved sheet thereagainst as the shaping element 100 is raised to a holding position at an elevation to allow entry of the carrier ring 114. At the same time the shaping rail 107 is retracted to its rest position below the conveyor rolls 22. The carrier ring 114 is moved into position beneath the shaping element 100 and the shaping element is lowered to position the curved sheet S approximate the support surface of the carrier ring 114, as indicated in phantom lines in FIG. 8. The vacuum on the shaping surface 101 is aborted, depositing the sheet onto the carrier ring 114. The shaping element 100 then is retracted to the upper rest position and the carrier ring 114 and the supported curved sheet are transported to the unloading station 117 whereat the sheet is transferred to the take-away roll section 118 as heretofore described.

While the aforementioned sequence of operation describes the upper shaping element 100 as being lowered into pressing engagement with glass sheet on the stationary lower shaping rail 107, it is anticipated that the upper shaping element 100 can, as well, be lowered to the press bending elevation and held stationary as the lower shaping rail 107 is raised to lift the sheet from rolls for press bending between the shaping surfaces 101 and 109 It also is anticipated that the upper shaping element 100 and lower shaping rail 107 may arrive simultaneously at the press bending elevation for press bending the sheet.

It is to be understood that the forms of the invention herewith shown and described are to be taken as illustrative embodiments of the same, and that various changes in the shape, size and arrangement of parts, as well as various procedural changes, may be resorted to without departing from the spirit of the invention.

What is claimed is:

1. A method of bending a glass sheet to a desired curvature comprising, heating said glass sheet to substantially the softening temperature thereof;

positioning said heated glass sheet in a generally horizontal plane between and in spaced relation to a pair of upper and lower press members having opposed complemental shaping surfaces corresponding to the desired curvature, said upper press member being carried on a support structure including a base plate secured to an upper platen frame, said upper platen frame being mounted for vertical movement toward and away from the generally horizontal plane and said upper press member being mounted for reciprocating movement relative to the base plate;

elevating said lower press member to engage and lift said heated glass sheet above the generally horizontal plane;

lowering said upper press member relative to said base plate into pressing engagement with said heated glass sheet to bend said heated glass sheet to the desired curvature between the complemental shaping surfaces;

raising said upper press member relative to said base plate; and lowering said lower press member to return the bent glass sheet to the generally horizontal plane.

2. A method of bending a glass sheet to a desired curvature comprising, heating said glass sheet to substantially the softening temperature thereof;

positioning said heated glass sheet in a generally horizontal plane between and in spaced relation to a pair of upper and lower press members having opposed complemental shaping surfaces corresponding to the desired curvature, said upper press member being carried on a support structure including a base plate secured to an upper platen frame, said upper platen frame being mounted for vertical movement toward and away from the generally horizontal plane and said upper press member being mounted for reciprocating movement relative to the base plate;

lowering said upper press member relative to said base plate to a predetermined location above the generally horizontal plane;

elevating said lower press member to engage and lift said heated glass sheet into pressing engagement with said upper pesos member to bend said heated glass sheet to the desired curvature between the complemental shaping surfaces;

lowering said lower press member to return the bent glass sheet to the generally horizontal plane; and raising said upper press member relative to said base plate.

3. A method of bending a glass sheet to a desired curvature comprising, heating said glass sheet to substantially the softening temperature thereof;

conveying said heated glass sheet in a generally horizontal path between and in spaced relation to an upper vacuum mold and a lower mold having opposed complemental shaping surfaces corresponding to the desired curvature, said upper vacuum mold being carried on a support structure including a base plate secure to an upper platen frame, said upper platen frame being mounted for vertical movement toward and away from the generally horizontally path and said upper press member being mounted for reciprocating movement relative to the base plate;

elevating said lower mold to engage and lift said heated glass sheet above the generally horizontal path;

lowering said upper vacuum mold relative to said base plate into pressing engagement with said heated glass sheet to bend said heated glass sheet to the desired curvature between the complemental shaping surfaces;

retaining the bent glass sheet against the shaping surface of said upper vacuum mold;

retracting said lower mold below said generally horizontal path;

positioning a carrier ring into a receiving position below said bent glass sheet;

releasing said bent glass sheet onto said carrier ring; and advancing said carrier ring and said bent glass sheet out of said receiving position.

4. A method cf bending a glass sheet as claimed in claim 3, including lowering said upper vacuum mold and said bent glass sheet relative to said base plate to position said bent glass sheet proximate said carrier ring prior to releasing said bent glass sheet onto said carrier ring.

5. A method of bending a glass sheet as claimed in claim 4, wherein after releasing said bent glass sheet onto said carrier ring said upper vacuum mold is raised relative to said base plate to clear said carrier ring and said bent glass sheet prior to advancing said carrier ring and said bent glass sheet out of said receiving position.

6. A method of bending a glass sheet as claimed in claim 3, including raising said upper vacuum mold and said bent glass sheet relative to said base plate to a holding position prior to positioning said carrier ring into said receiving position.

7. A method of bending a glass sheet as claimed in claim 6, including lowering said upper vacuum mold and said bent glass sheet relative to said base plate to position said bent glass sheet proximate said carrier ring prior to releasing said bent glass sheet onto said carrier ring.

8. A method of bending a glass sheet as claimed in claim 7, wherein after releasing said bent glass sheet onto said carrier ring said upper vacuum mold is raised relative to said base plate to clear said carrier ring and said bent glass sheet prior to advancing said carrier ring and said bent glass sheet out of said receiving position.

9. A method of bending a glass sheet to a desired curvature comprising, heating said glass sheet to substantially the softening temperature thereof;

conveying said heated glass sheet in a generally horizontal path between and in spaced relation to an upper vacuum mold and a lower mold having opposed complemental shaping surfaces corresponding to the desired curvature, said upper vacuum mold being carried on a support structure including a base plate secure to an upper platen frame, said upper platen frame being mounted for vertical movement toward and away from the generally horizontally path and said upper press member being mounted for reciprocating movement relative to the base plate;

lowering said upper vacuum mold relative to said base plate to a predetermined location above said generally horizontal path;

elevating said lower mold to engage and lift said heated glass sheet into pressing engagement with said upper vacuum mold to bend said heated glass sheet to the desired curvature between the complemental shaping surfaces;

retaining the bent glass sheet against the shaping surface of said upper vacuum mold;

retracting said lower mold below the generally horizontal path;

positioning a carrier ring into a receiving position below said bent glass sheet;

releasing said bent glass sheet onto said carrier ring; and advancing said carrier ring and said bent glass sheet out of said receiving position.

10. A method of bending a glass sheet as claimed in claim 9, including lowering said upper vacuum mold and said bent glass sheet relative to said base plate to position said bent glass sheet proximate said carrier ring prior to releasing said bent glass sheet onto said carrier ring.

11. A method of bending a glass sheet as claimed in claim 10, wherein after releasing said bent glass sheet onto said carrier ring said upper vacuum mold is raised relative to said base plate to clear said carrier ring and said bent glass sheet prior to advancing said carrier ring and said bent glass sheet out of said receiving position.

12. A method of bending a glass sheet as claimed in claim 9, including raising said upper vacuum mold and said bent glass sheet relative to said base plate to a holding position prior to positioning said carrier ring into said receiving position.

13. A method of bending a glass sheet as claimed in claim 12, including lowering said upper vacuum mold and said bent glass sheet relative to said base plate to position said bent glass sheet proximate said carrier ring prior to releasing said bent glass sheet onto said carrier ring.

14. A method of bending a glass sheet as claimed in claim 13, wherein after releasing said bent glass sheet onto said carrier ring said upper vacuum mold is raised relative to said base plate to clear said carrier ring and said bent glass sheet prior to advancing said carrier ring and said bent glass sheet out of said receiving position.

15. A method of bending a glass sheet to a desired curvature comprising, heating said glass sheet to substantially the softening temperature thereof;

conveying said heated glass sheet on a series of conveyor rolls in a generally horizontal path between and in spaced relation to an upper vacuum mold and a lower mold having opposed complemental shaping surfaces corresponding to the desired curvature, said upper vacuum mold being carried on a support structure including a base plate secured to an upper plate frame, said upper platen frame being mounted for vertical movement toward and away from the generally horizontal path and said upper press member being mounted for reciprocating movement relative to the base plate;

elevating said lower mold to engage and lift said heated glass sheet above the generally horizontal path;

lowering said upper vacuum mold relative to said base plate into pressing engagement with said heated glass sheet to bend said heated sheet to the desired curvature between the complemental shaping surfaces;

retaining the bent glass sheet against the shaping surface of said upper vacuum mold;

retracting said lower mold below the generally horizontal path;

releasing said bent glass sheet onto the generally horizontal path; and advancing said bent glass sheet along the generally horizontal path.

16. A method of bending a glass sheet as claimed in claim 15, including lowering said upper vacuum mold and said bent glass sheet relative to said base plate to position said bent glass sheet proximate the generally horizontal path prior to releasing said bent glass sheet onto the generally horizontal path.

17. A method of bending a glass sheet as claimed in claim 16, wherein after releasing said bent glass sheet said upper vacuum mold is raised relative to said base plate to clear said bent glass sheet prior to advancing said bent glass sheet along the generally horizontally path.

18. A method of bending a glass sheet to a desired curvature comprising, heating said glass sheet to substantially the softening temperature thereof;

conveying said heated glass sheet on a series of conveyor rolls in a generally horizontal path between and in spaced relation to an upper vacuum mold and a lower mold having opposed complemental shaping surfaces corresponding to the desired curvature, said upper vacuum mold being carried on a support structure including a base plate secured to an upper plate frame, said upper platen frame being mounted for vertical movement toward and away from the generally horizontal path and said upper press member being mounted for reciprocating movement relative to the base plate;

lowering said upper vacuum mold relative to said base plate to a predetermined location above said generally horizontal path;

elevating said lower mold to engage and lift said heated glass sheet into pressing engagement with said upper vacuum mold to bend said heated glass sheet to the desired curvature between the complemental shaping surfaces;

retaining the bent glass sheet against the shaping surface of said upper vacuum mold;

retracting said lower mold below the generally horizontal path;

releasing said bent glass sheet onto the generally horizontal path; and advancing said bent glass sheet along the generally horizontal path.

19. A method of bending a glass sheet as claimed in claim 18, including lowering said upper vacuum mold and said bent glass sheet relative to said base plate to position said bent glass sheet proximate the generally horizontal path prior to releasing said bent glass sheet onto the generally horizontal path.

20. A method of bending a glass sheet as claimed in claim 19, wherein after releasing said bent glass sheet said upper vacuum mold is raised relative to said base plate to clear said bent glass sheet prior to advancing said bent glass sheet along the generally horizontally path.

21. An apparatus for press bending a heat softened glass sheet to a desired curvature comprising, a framework, a conveyor for supporting a heat softened glass sheet in a generally horizontal plane within said framework, upper and lower platen frames disposed on opposite sides of said conveyor and mounted for reciprocating movement toward and away from said conveyor, upper and lower mold members having opposed complemental shaping surfaces corresponding to the desired curvature, and means for supporting said upper and lower mold members on said respective upper and lower platen frames, said means for supporting said upper mold member including a base plate attached to said upper platen frame and means for mounting said upper mold member on said base plate for reciprocating movement relative thereto, said mounting means including means for moving said upper mold member relative to said base plate to effect the press bending of the heat softened glass sheet between the opposed complemental shaping surfaces.

22. An apparatus as claimed in claim 21, wherein said means for moving comprises a fluid actuator operably interconnecting said base plate and said upper mold member.

23. An apparatus as claimed in claim 22, wherein said means for mounting includes means for guiding the movement of said upper mold member relative to said base plate.

* * * * *